US007330247B2

(12) United States Patent
Hasegawa

(10) Patent No.: US 7,330,247 B2
(45) Date of Patent: Feb. 12, 2008

(54) APPARATUS AND METHOD FOR CONNECTING OPTICAL WAVEGUIDES

(75) Inventor: Masaki Hasegawa, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 11/213,559

(22) Filed: Aug. 26, 2005

(65) Prior Publication Data

US 2006/0067625 A1   Mar. 30, 2006

(30) Foreign Application Priority Data

Sep. 27, 2004   (JP) .............................. 2004-280317

(51) Int. Cl.
*G01B 11/26* (2006.01)
*G02B 6/26* (2006.01)
(52) U.S. Cl. ........................... 356/153; 385/50; 385/52
(58) Field of Classification Search ................ 356/153; 385/50, 52
See application file for complete search history.

(56) References Cited

U.S. PATENT DOCUMENTS 6,463,197 B1 * 10/2002 Dragone ...................... 385/50

FOREIGN PATENT DOCUMENTS

| JP | 08-043689 | 2/1996 |
|----|-----------|--------|
| JP | 08-075938 | 3/1996 |
| JP | 2004-219786 | 8/2004 |

* cited by examiner

*Primary Examiner*—Roy M. Punnoose
(74) *Attorney, Agent, or Firm*—Daniel E. McConnell; Jason O. Piche

(57) ABSTRACT

Apparatus and method which adjusts an optical connection between a waveguide and an optical interconnection component that launches light into the waveguide or receives light emitted from the waveguide. The apparatus includes: an excitation light element emitting light that causes the waveguide to fluoresce into the waveguide via the optical interconnection component; an observation unit that observes the waveguide from a side face, different from the end face into which light is launched into the waveguide or light having propagated through the waveguide is emitted, and which receives fluorescent light emitted by the waveguide; and a connection adjusting component that adjusts the optical connection between the optical interconnection component and the waveguide based on the intensity of the fluorescent light received at the light observing section.

18 Claims, 13 Drawing Sheets

APPARATUS AND METHOD FOR CONNECTING OPTICAL WAVEGUIDES

FIELD AND BACKGROUND OF INVENTION

The present invention relates to an aligner and an alignment method for an optical connection, and a method of establishing an optical interconnection. In particular, the present invention relates to an aligner and an alignment method for an optical connection in optical communications, and a method of establishing an optical interconnection in optical communications.

SUMMARY OF THE INVENTION

Recent demand for higher capacity communications makes the optical communications, which permit high-rate transmission and are free from problems of interference or noise, become a focus of attention not only as means for long-distance communications means but also as means for communications between boards or chips in one server. Currently, considering the transmission loss of the transmitting material and the wavelength of the light from the light source, wavelengths of 1.55, 1.3 and 0.85 microns within the near-infrared region are used for optical communications. The wavelengths of 1.55 and 1.3 microns are allocated for long-distance communications, and the wavelength of 0.85 microns is allocated for short-distance communications. These wavelengths are out of the visible wavelength region of the human eye and are hardly absorbed by the transmitting material, and thus, the light propagating through the material cannot be externally observed.

In communications between boards or chips, waveguides composed of a laminated structure of a core and a clad on an electric substrate, which are intended to directly interconnect photodiodes or laser diodes, are used with other components, such as a component for redirecting light and a condensing lens. In this case, there is a problem with optical axis alignment between the components. Optical fibers and waveguides, which transmit light using the total internal reflection at the interface between the core and the clad whose indexes of refraction are different, are quite small. Specifically, multi-mode ones have a diameter of 50 microns, and single-mode ones have diameters from 8 to 10 microns. Thus, a slight misalignment leads to a significant transmission loss. Therefore, alignment of the core positions (optical axes) of optical devices is highly important.

As for waveguides, the difference in index of refraction between the core and the clad is quite small, specifically, a few percents or lower, and thus, it is difficult to find the position of the core by the naked eye. Therefore, according to a conventional technique, reflection light or a microscope is used to find the position of the core of the waveguide, and the position of the core is marked. Besides, there has been proposed a technique of making the core visible by adding a coloring matter (dye) that has a visible color or can emit fluorescent light when irradiated with ultraviolet rays to the core material (see Japanese Published Unexamined Application No. 8-075938).

Once the position of the core is found by such techniques, the optical device for launching light into the waveguide can be abutted against the core to launch light into the core, and the intensity of the light emitted from the waveguide can be measured, thereby finding the position of the optical device at which the highest intensity is achieved (see Japanese Published Unexamined Application No. 2004-219786). Although there is no problem with this technique if the waveguide has one optical device connected to one of the end faces, there is a problem if the waveguide has optical devices connected to the both end faces thereof.

In this case, according to a possible alignment method, a launching optical fiber is abutted against one end face of the core to launch light into the core, emission light monitoring optical fiber is abutted against the other end face of the core to measure the intensity of the light emitted from the core, and the positions of the optical fiber on the incidence side, the optical fiber on the outgoing side and the waveguide are adjusted simultaneously. However, since the position adjustment is performed simultaneously on the incidence side and the outgoing side, there is a possibility that the optical fibers and the waveguide can be adjusted to local optimum positions.

On the other hand, there has been proposed a technique of adding a substance that produces fluorescent light to the core material of the waveguide and irradiating the waveguide with ultraviolet rays at the side face thereof to cause the substance to emit fluorescent light (see Japanese Published Unexamined Application No. 8-043689). According to this technique, the produced fluorescent light propagates through the waveguide and is emitted from the optical fibers connected to the both end faces of the waveguide. Thus, by monitoring the intensity of the fluorescent light emitted from the optical fibers, the optical fibers on the incidence side and the outgoing side can be separately adjusted. Therefore, compared to the technique of performing position adjustment simultaneously on the incidence side and the outgoing side, the optical fibers and the waveguide are unlikely to be adjusted to local optimum positions. However, according to Japanese Published Unexamined Application No. 8-043689, since the light that causes the waveguide to emit fluorescent light is irradiated to the side face of the waveguide, a dedicated fluorescent light device, which is not necessary for conventional communications, has to be provided. In addition, since the light launching method and the light propagation direction significantly differ from those in conventional communications, the precision of the optical axis alignment may be low. Furthermore, adding a coloring matter or a fluorescent material to the material of the waveguide may increase the propagation loss of the light that is actually propagated in optical communications.

The technique disclosed in Japanese Published Unexamined Application No. 8-075938 is intended to make the core visible as described above and is not a technique for optical axis alignment. In addition, the technique disclosed in Japanese Published Unexamined Application No. 2004-219786 may have a problem when the optical axis alignment is performed both on the incidence side and the outgoing side, as described above. Furthermore, since the technique disclosed in Japanese Published Unexamined Application No. 2004-219786 is a technique for adjusting the positional relationship between a light emitting element and a waveguide, it is difficult to apply the technique to optical axis alignment between waveguides.

Thus, an object of the present invention is to provide an aligner and an alignment method for an optical connection and a method of establishing an optical interconnection which can solve the problems described above. This object can be attained by combinations of characteristics stated in the independent claims of the claims, and the dependent claims of the claims prescribe advantageous specific embodiments of the present invention.

In order to attain the object described above, according to a first implementation of the present invention, there are provided (1) an aligner that adjusts an optical connection between a waveguide and an optical interconnection component that launches light into the waveguide or receives light emitted from the waveguide, comprising: an excitation light launching section that launches light that causes the waveguide to emit fluorescent light into the waveguide via the optical interconnection component; a light observing section that observes the waveguide from a side face, which is different from the end face from which light is launched into the waveguide or light having propagated through the waveguide is emitted, and receives the fluorescent light emitted by the waveguide; and a connection adjusting section that adjusts the optical connection between the optical interconnection component and the waveguide based on the intensity of the fluorescent light received at the light observing section, (2) an alignment method using the aligner, and (3) a method of establishing an optical interconnection using the aligner In addition, according to a second implementation of the present invention, there are provided (1) an aligner that adjusts an optical connection between a waveguide and an optical interconnection component that launches light into the waveguide or receives light emitted from the waveguide, comprising: an excitation light launching section that launches light that causes the waveguide to emit fluorescent light into the waveguide via the optical interconnection component; a light observing section that receives the fluorescent light emitted from the waveguide to the optical interconnection component; and a connection adjusting section that adjusts the optical connection between the optical interconnection component and the waveguide based on the intensity of the fluorescent light received by the light observing section, (2) an alignment method using the aligner, and (3) a method of establishing an optical interconnection using the aligner

BRIEF DESCRIPTION OF DRAWINGS

Some of the purposes of the invention having been stated, others will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
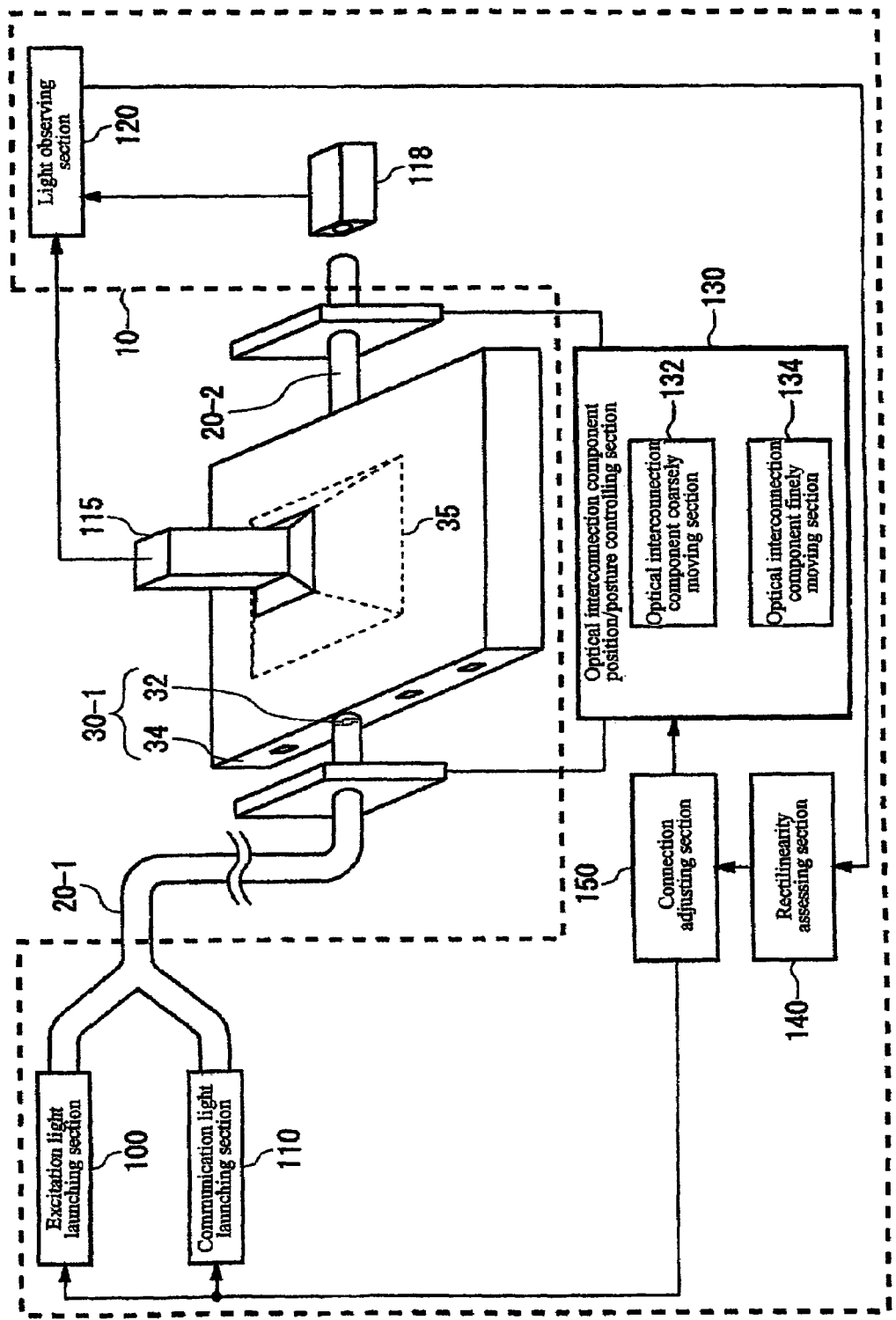
FIG. 1 shows an arrangement of an aligner 10.

FIG. 1 shows an arrangement of an aligner 10. The aligner 10 comprises an excitation light launching section 100, a communication light launching section 110, a light observing section 120, an optical interconnection component position/posture controlling section 130, a rectilinearly assessing section 140, and a connection adjusting section 150. The aligner 10 is intended to adjust the optical connection between a waveguide in a waveguide substrate 30-1 and an optical fiber 20-1, which is an optical interconnection component for launching light into the waveguide, with a precision higher than ever before.

The excitation light launching section 100 launches excitation light, which causes the waveguide to emit fluorescent light, into the waveguide in the waveguide substrate 30-1 via the optical fiber 20-1. Specifically, the waveguide in the waveguide substrate 30-1 has a core 32 for transmitting light there through, and a clad 34 surrounding the core 32. The excitation light has a wavelength different from that of the light used for optical communications and causes the core material to emit fluorescent light, and the excitation light launching section 100 launches the excitation light directly into the core 32 via the optical fiber 20-1 without transmission of the excitation light through the interface between the core 32 and the clad 34.

More specifically, the excitation light launching section 100 may launch light that causes a waveguide made of an inorganic material to emit fluorescent light within the visible wavelength region into the waveguide in the waveguide substrate 30-1. Furthermore, the excitation light launching section 100 may launch light that causes a waveguide made of an organic material, such as polysilane, acrylic and epoxy, rather than inorganic materials, to emit fluorescent light within the visible wavelength region into the waveguide in the waveguide substrate 30-1. For example, the excitation light launching section 100 may launch green light having a wavelength of 543 nm from the He—Ne laser into the optical fiber 20-1 through a condensing objective lens.

Here, the optical fiber 20-1 is an example of a first optical interconnection component according to the present invention. Alternatively, the optical interconnection component may be a substrate provided with a waveguide for propagating light, an optical path redirecting pin that changes the direction of light propagation by 90 degrees, a splitter that splits a beam of incident light into plural beams of light for emission in different directions, an optical combiner that combines plural beams of incident light from different directions into one beam of light for emission in one direction, or a micro lens that condenses light emitted. Alternatively, the optical interconnection component may be a light emitting element that emits light or a light receiving element that receives light.

The communication light launching section 110 launches light for optical communications into the waveguide in the waveguide substrate 30-1 via the optical fiber 20-1. For example, the communication light launching section 110 is used independently (or exclusively) of the excitation light launching section 100 to improve the alignment precision of the optical connection. The light observing section 120 observes the waveguide in the waveguide substrate 30-1 from a side face that is different from an end face at which the light propagating through the waveguide is launched or emitted and receives the fluorescent light emitted from the waveguide. That is, the light observing section 120 receives the fluorescent light emitted from the inside of the core 32 through the clad 34.

Specifically, the position and focus of a camera 115 are previously determined so that it can take a picture with a range in which the core 32 in the waveguide substrate 30-1 exists. The light observing section 120 may use the camera 115 to take a picture of the image formed by the fluorescent light emitted from the side face of the waveguide of the waveguide substrate 30-1. In addition, in order to further improve the alignment precision of the optical connection, the light observing section 120 may measure the intensity of the transmitted light transmitted through the waveguide of the waveguide substrate 30-1 with a camera 118.

The optical interconnection component position/posture controlling section 130 moves the optical fiber 20-1 with respect to the waveguide substrate 30-1, thereby changing the position or angle of the optical fiber 20-1 with respect to the waveguide substrate 30-1. For example, the optical interconnection component position/posture controlling section 130 has an optical interconnection component coarsely moving section 132 that moves the optical fiber 20-1 with respect to the waveguide substrate 30-1 on a predetermined first-unit-distance basis and an optical interconnection component finely moving section 134 that moves the optical fiber 20-1 with respect to the waveguide substrate 30-1 on a predetermined second-unit-distance basis, the second unit distance being shorter than the first unit distance.

The rectilinearly assessing section 140 assesses the rectilinearly of the light propagating through the waveguide in the waveguide substrate 30-1 based on the fluorescent light image taken by the light observing section 120. Then, based on the rectilinearly of the light assessed by the rectilinearly assessing section 140, the connection adjusting section 150 adjusts the optical connection between the optical fiber 20-1 and the waveguide substrate 30-1. For example, the connection adjusting section 150 can assess the rectilinearly of the image of the light each time the optical interconnection component position/posture controlling section 130 moves the optical fiber 20-1, and then determine the position of the optical fiber 20-1 at which the highest rectilinearly is achieved as the installation position for the optical fiber 20-1. Furthermore, the connection adjusting section 150 may adjust the optical connection between an optical fiber 20-2, which is an example of a second optical interconnection component, and the waveguide substrate 30-1.

Figure 2:
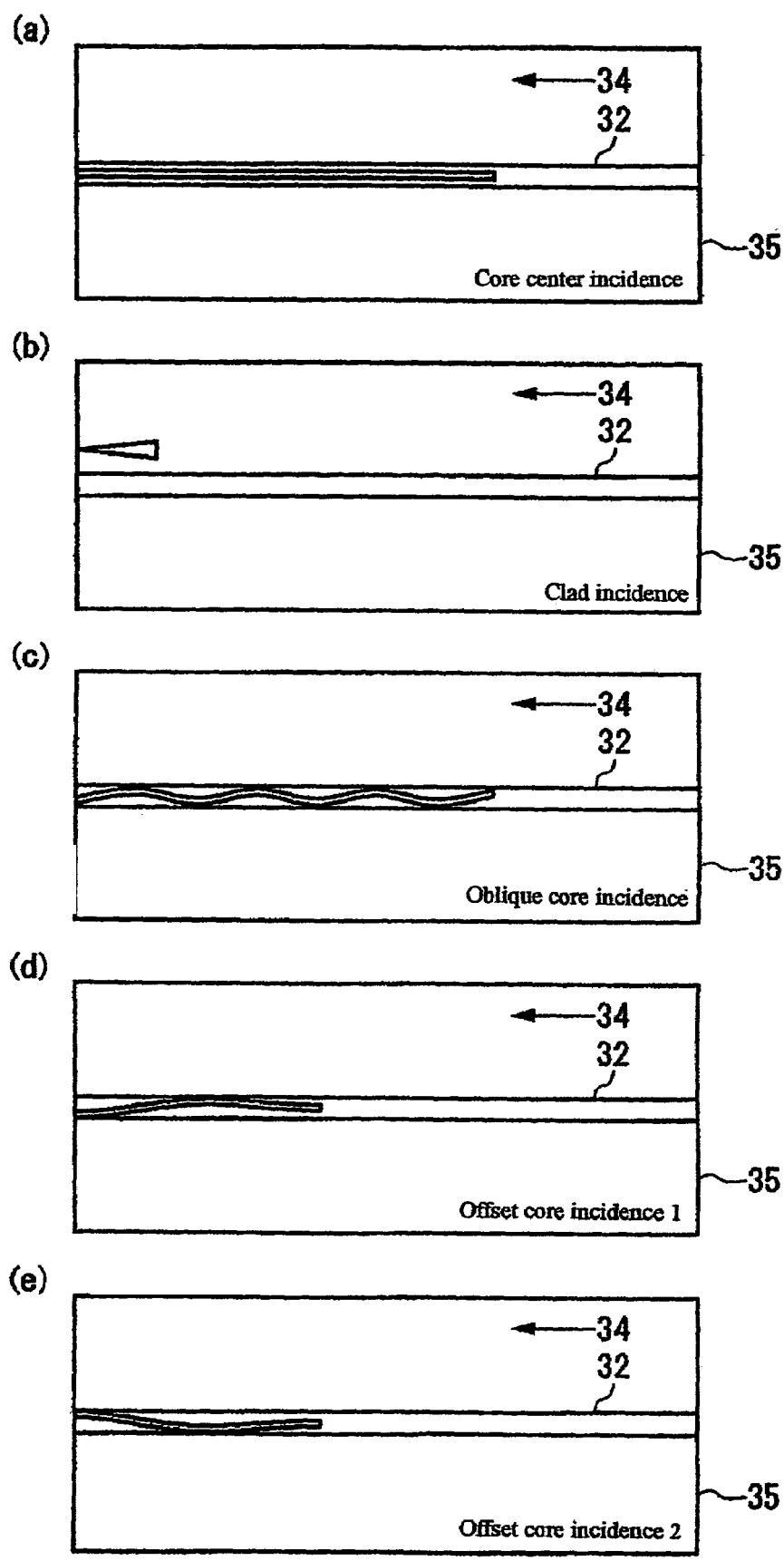
FIG. 2 shows specific examples of fluorescent light images taken within a picture taking range 35.

FIG. 2 shows specific examples of fluorescent light images taken in a picture taking range 35. FIG. 2(*a*) shows an example of the fluorescent light image in the case where the excitation light is incident on the core 32 at the center of the end face thereof. This type of incidence is referred to as a core center incidence. The incident light propagates rectilinearly along the centerline of the core 32. In this case, the image has a high contrast, and the incident light is observed as a narrow image. FIG. 2(*b*) shows an example of the fluorescent light image in the case where the excitation light is incident on the clad 34. This type of incidence is referred to as a clad incidence. The incident light is diffused in the clad 34 and propagates over a short distance.

FIG. 2(*c*) shows an example of the fluorescent light image in the case where the excitation light is obliquely incident on the end face of the core 32. This type of incidence is referred to as an oblique core incidence. The incident light is repeatedly reflected on the interface between the core 32 and the clad 34. In this case, the light is attenuated due to the reflections, and the intensity of the light decreases. FIGS. 2(*d*) and 2(*e*) show examples of fluorescent light images in the case where the excitation light is incident on the end face of the core 32 at a point displaced from the center. Such type of incidence is referred to as an offset core incidence, and the example shown in FIG. 2(*d*) is referred to as an offset core incidence 1, and the example in FIG. 2(*e*) is referred to as an offset core incidence 2. The incident light propagating through the core meanders due to diffusion and reflection and gradually comes close to the centerline of the core. In this case, the intensity of the light decreases, and the light image has a low contrast.

As described above, when the light image is not observed in the form of a straight line, the light does not propagate rectilinearly and is attenuated in a short time. The rectilinearly assessing section 140 assesses the rectilinearly of the light as higher when the variation of the inclination of the fluorescent light image taken by the light observing section 120 from a desired propagation direction of the light propagating through the waveguide with respect to the propagation direction is smaller. For example, the rectilinearly assessing section 140 may integrate the absolute value of the inclination of the fluorescent light image with respect to the propagation direction and assess the light rectilinearly as higher when the integral value is smaller.

Figure 3:
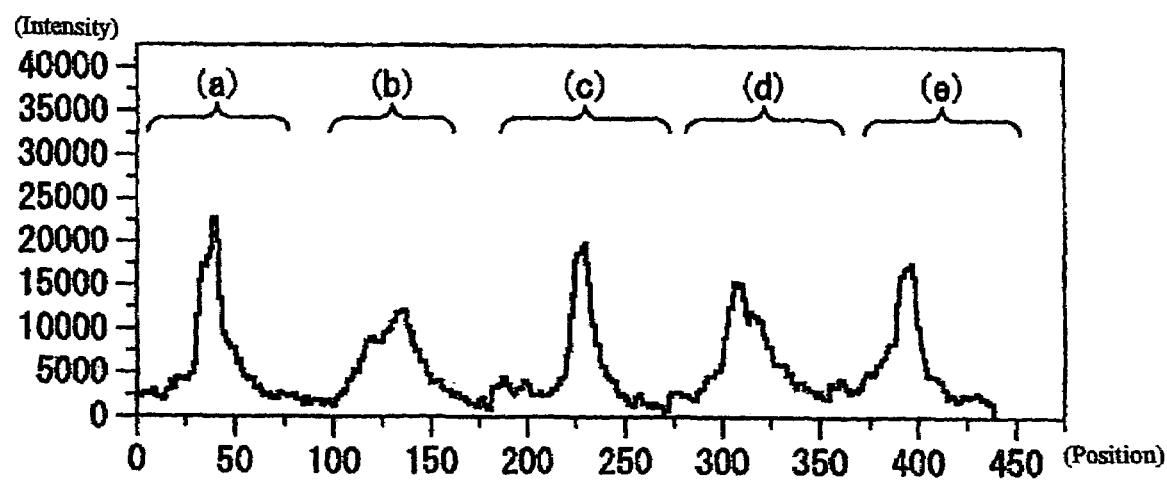
FIG. 3 shows the intensities of fluorescent light images taken in the picture taking range 35, along a line perpendicular to the direction of propagation of the light.

FIG. 3 shows the intensities of fluorescent light of fluorescent light images taken in the picture taking range 35, plotted along a line perpendicular to the direction of propagation of the fluorescent light. This drawing shows a case where the excitation light is incident on five parallel waveguides according to the core center incidence, the clad incidence, the oblique clad incidence, the offset core incidence 1 and the offset core incidence 2, respectively. These types of incidence correspond to the examples shown in FIGS. 2(*a*) to 2(*e*).

In the case (a) of the core center incidence, the highest intensity of the fluorescent light is 23000. And the full width at half maximum (FWHM), which is the distance between points of the intensity curve at which the intensity reaches half its maximum (highest) value is 20. In the case (b) of the clad incidence, the highest intensity of the fluorescent light is 13000. And the full width at half maximum is 80.

In the case (c) of the oblique core incidence, the highest intensity of the fluorescent light is 20000. And the full width at half maximum is 20. In the case (d) of the offset core incidence 1, the highest intensity of the fluorescent light is 18000.

And the full width at half maximum is 70. In the case (e) of the offset core incidence 2, the highest intensity of the fluorescent light is 19000. And the full width at half maximum is 50.

When the contrast of the light image is low, the light does not propagate rectilinearly, and the intensity of the light is low. Thus, for example, the rectilinearly assessing section 140 calculates the distance along a line perpendicular to the propagation direction of the fluorescent light from a point at which the fluorescent light of the fluorescent light image taken by the light observing section 120 has the highest intensity to a point at which the intensity of the fluorescent light reaches a predetermined percentage of the highest intensity. As an example, the rectilinearly assessing section 140 calculates the full width at half maximum, which is the distance between points of the fluorescent light intensity at which the intensity reaches half its highest value.

Then, the rectilinearly assessing section 140 assesses the rectilinearly of the light as higher when the full width at half maximum is smaller, because the fluorescent light image has a higher contrast when the full width at half maximum is smaller. More specifically, the rectilinearly assessing section 140 may assess the rectilinearly of the fluorescent light as higher when the integral value of the full width at half maximum with respect to the propagation direction is smaller.

Alternatively or additionally, the rectilinearly assessing section 140 may assess the rectilinearly of the fluorescent light as higher when the symmetry of the fluorescent light image taken by the light observing section 120 along the line perpendicular to the propagation direction of the fluorescent light with respect to the point at which the fluorescent light has the highest intensity is higher. More specifically, the rectilinearly assessing section 140 may calculate the integral value of the difference between the full width at half maximum on one side of the point at which the fluorescent light has the highest intensity and the full width at half maximum on the other side with respect to the propagation direction and assesses the rectilinearly of the fluorescent light as higher when the integral value is smaller.

Figure 4:
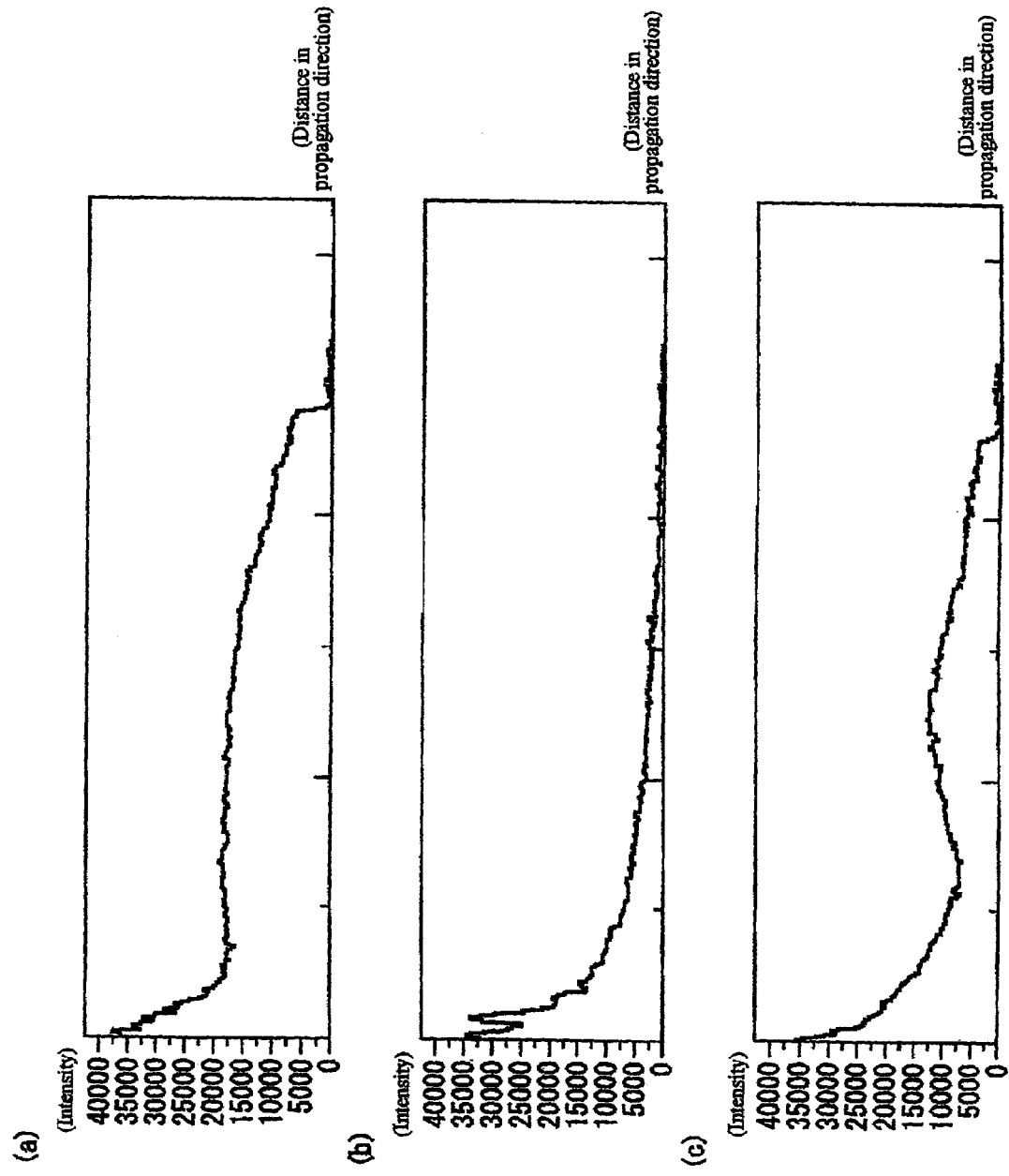
FIG. 4 shows variations of intensity of fluorescent light images taken in the picture taking range 35, along the direction of propagation of the light.
Figure 5:
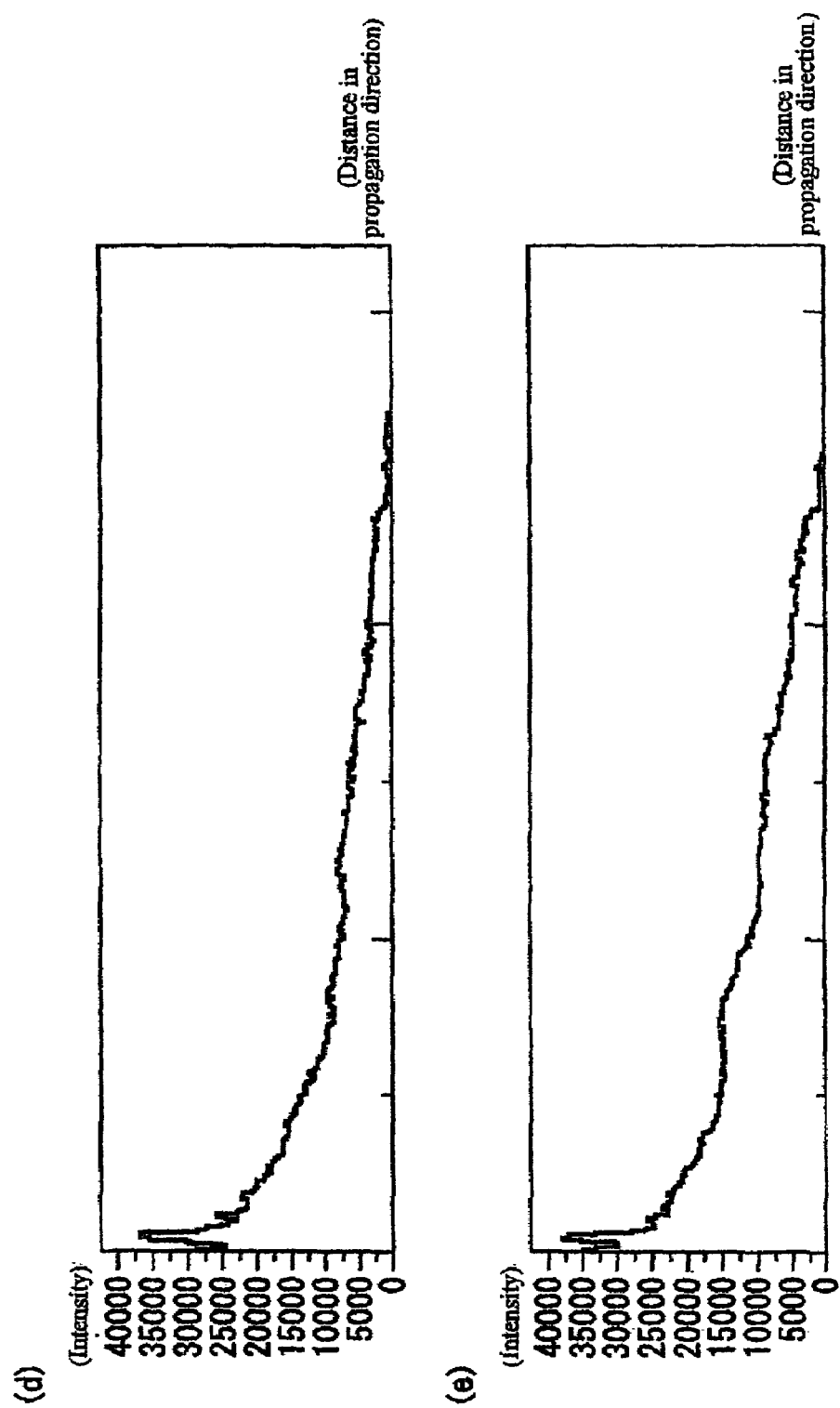
FIG. 5 shows variations of intensity of fluorescent light images taken in the picture taking range 35, along the direction of propagation of the light.

FIGS. 4 and 5 show variations of the intensity of the fluorescent light of the fluorescent light images taken in the picture taking range 35 in the propagation direction of the light. The intensities of the fluorescent light correspond to the types of incidence shown in FIGS. 2(*a*) to 2(*e*). In the case (a) of the core center incidence, the variation of the intensity is small, and the attenuation of the intensity is modest. In the case (b) of the clad incidence, the attenuation of the intensity is abrupt, although the variation of the intensity is small. In the case (c) of the oblique core incidence, the variation of the intensity is large. In the case of (d) the offset core incidence 1 and the case (e) of the offset core incidence 2, the variation of the intensity is large, and the attenuation of the intensity is abrupt.

In this way, when the variation of the intensity of the fluorescent light is large, the rectilinearly of the light is low, and the light is attenuated in a short time. Thus, the rectilinearly assessing section 140 assesses the rectilinearly of the light as higher when the variation of the brightness of the fluorescent light image taken by the light observing section 120 in the propagation direction of the light propagating through the waveguide is smaller.

Methods of assessing the rectilinearly of the light by the rectilinearly assessing section 140 have been described with reference to FIGS. 2 through 5. However, the present invention is not limited to the rectilinearly assessing methods described above. For example, the rectilinearly assessing section 140 may evaluate the contrast, symmetry intensity variation or the like of the fluorescent light image according to an existing image analysis algorithm and assess the rectilinearly of the fluorescent light based on the evaluation value.

Here, FIGS. 2 through 5 show experimental data concerning fluorescent light images in the cases where the excitation light is launched into a waveguide substrate 30-1 having a core having a diameter of 50 microns, an upper cladding layer having a thickness of 50 microns and a lower cladding layer having a thickness of 50 microns via an optical fiber 20-1 having a core having a diameter of 50 microns and a clad having a diameter of 125 microns. In this case, since the optical fiber 20-1 and the waveguide substrate 30-1 have the same core diameter, the excitation light launched via the optical fiber 20-1 is likely to be incident on the core or clad of the waveguide substrate 30-1. Thus, the excitation is rarely incident on both the core and clad of the waveguide substrate 30-1.

On the other hand, if the core diameter of the optical fiber 20-1 is larger than the core diameter of the waveguide substrate 30-1, the excitation light may be launched from the optical fiber 20-1 into both the core and the clad of the waveguide substrate 30-1. In such a case, the excitation light propagates through the core and the clad. However, the excitation light launched into the clad is attenuated significantly faster than the excitation light launched into the core. Therefore, if the image of the light is analyzed and the assessment is conducted with respect to the area in which the highest light intensity is achieved, the rectilinearly of the excitation light launched into the core can be solely assessed. Thus, even if the core diameter of the optical fiber 20-1 is larger than the core diameter of the waveguide substrate 30-1, the aligner 10 according to this embodiment can adequately assess the rectilinearly of the incident light by analyzing the image with respect to the point at which the fluorescent light has the highest intensity.

Now, four application examples of the aligner 10 used for optical connection adjustment will be described.

Figure 6:
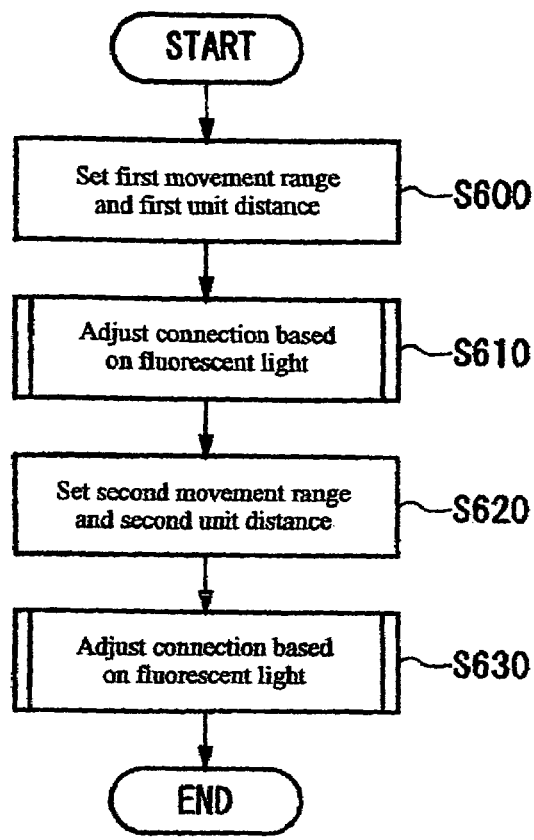
FIG. 6 shows an operation flow of optical connection adjustment by the aligner 10 according to a first application example.

FIG. 6 shows an operation flow chart of optical connection adjustment by the aligner 10 according to a first application example. The optical interconnection component coarsely moving section 132 sets a predetermined first movement range as a range of movement of the optical fiber 20-1 with respect to the waveguide substrate 30-1 (S600). In addition, the optical interconnection component coarsely moving section 132 sets a predetermined first-unit-distance, which is a unit distance of movement of the optical fiber 20-1 with respect to the waveguide substrate 30-1.

With these settings, based on the intensity of the fluorescent light received at the light observing section 120, the connection adjusting section 150 adjusts the optical connection between the optical fiber 20-1 and the waveguide substrate 30-1 (S610). Specifically, each time the optical interconnection component coarsely moving section 132 moves the optical fiber 20-1, the light observing section 120 receives the fluorescent light emitted from the side face of the waveguide in the waveguide substrate 30-1. Then, the connection adjusting section 150 determines the position of the optical fiber 20-1 at which the light observing section 120 receives the fluorescent light of the highest intensity as the installation position for the optical fiber 20-1. This process will be described in more detail later.

In addition, the aligner 10 may adjust the optical connection of the optical fiber 20-2 to the waveguide substrate 30-1 through substantially the same steps as the steps S600 and S610. Thus, since the optical connection can be adjusted separately on the incidence side and at the outgoing side, it can be prevented to set the optical fiber at a locally optimum position. In addition, since each optical connection can be adjusted separately, the adjustment process can be simplified and the adjustment precision can be improved if multiple optical interconnection components are successively connected in series to each other.

Then, the optical interconnection component finely moving section 134 sets a second movement range that contains the position of the optical fiber 20-1 at which the light observing section 120 receives the fluorescent light of the highest intensity and is narrower than the first movement range as a range of movement of the optical fiber 20-1 with respect to the waveguide substrate 30-1 (S620). In addition, the optical interconnection component finely moving section 134 sets a predetermined second-unit-distance shorter than the first-unit-distance, which is a unit distance of movement of the optical fiber 20-1 with respect to the waveguide substrate 30-1.

With these settings, based on the intensity of the fluorescent light received at the light observing section 120, the connection adjusting section 150 adjusts the optical connection between the optical fiber 20-1 and the waveguide substrate 30-1 (S630). Specifically, each time the optical interconnection component finely moving section 134 moves the optical fiber 20-1, the light observing section 120 receives the fluorescent light emitted from the side face of the waveguide in the waveguide substrate 30-1. Then, the connection adjusting section 150 determines the position of the optical fiber 20-1 at which the light observing section 120 receives the fluorescent light of the highest intensity, as the installation position for the optical fiber 20-1. In addition, the aligner 10 may adjust the optical connection of the optical fiber 20-2 to the waveguide substrate 30-1 through substantially the same steps as the steps S620 and S630.

In this way, the aligner 10 conducts a coarse adjustment and then conducts a more precise adjustment with a narrower movement range of the optical fiber. Thus, the time required for adjustment can be reduced, and the adjustment precision can be improved.

Figure 7:
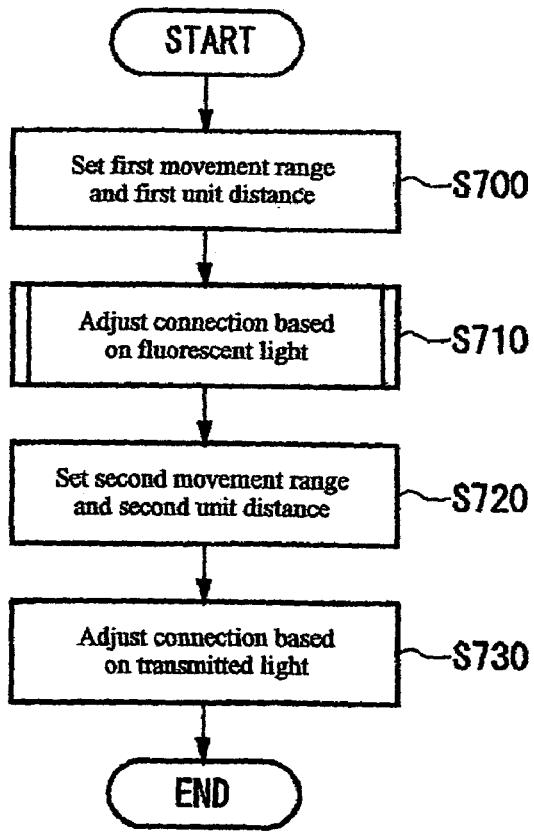
FIG. 7 shows an operation flow of optical connection adjustment by the aligner 10 according to a second application example.

FIG. 7 shows an operation flow of optical connection adjustment by the aligner 10 according to a second application example. The steps S700 to S720 are substantially the same as the steps S600 to S620 described with reference to FIG. 6 and thus will not be described below. With the setting in step S720, the connection adjusting section 150 adjusts the optical connection between the optical fiber 20-1 and the waveguide substrate 30-1 based on the intensity of the light for optical communications that has been launched by the communication light launching section 110 and transmitted through the waveguide in the waveguide substrate 30-1 (S730).

Specifically, each time the optical interconnection component finely moving section 134 moves the optical fiber 20-1, the light observing section 120 receives the transmitted light transmitted through the waveguide in the waveguide substrate 30-1. Then, the connection adjusting section 150 determines the position of the optical fiber 20-1 at which the light observing section 120 receives the transmitted light of the highest intensity as the installation position for the optical fiber 20-1.

As described above, according to the application example shown in this drawing, the connection adjusting section 150 firstly adjusts the optical connection between the optical fiber 20-1 and the waveguide substrate 30-1 with a predetermined precision based on the intensity of the fluorescent light received at the light observing section 120. Then, the connection adjusting section 150 adjusts the optical connection between the optical fiber 20-1 and the waveguide substrate 30-1 with a precision higher than the predetermined precision based on the intensity of the transmitted light launched into the waveguide by the communication light launching section 110 and transmitted through the waveguide. Thus, in the situation in which the transmitted light can be observed, the adjustment precision an be further improved.

Figure 8:
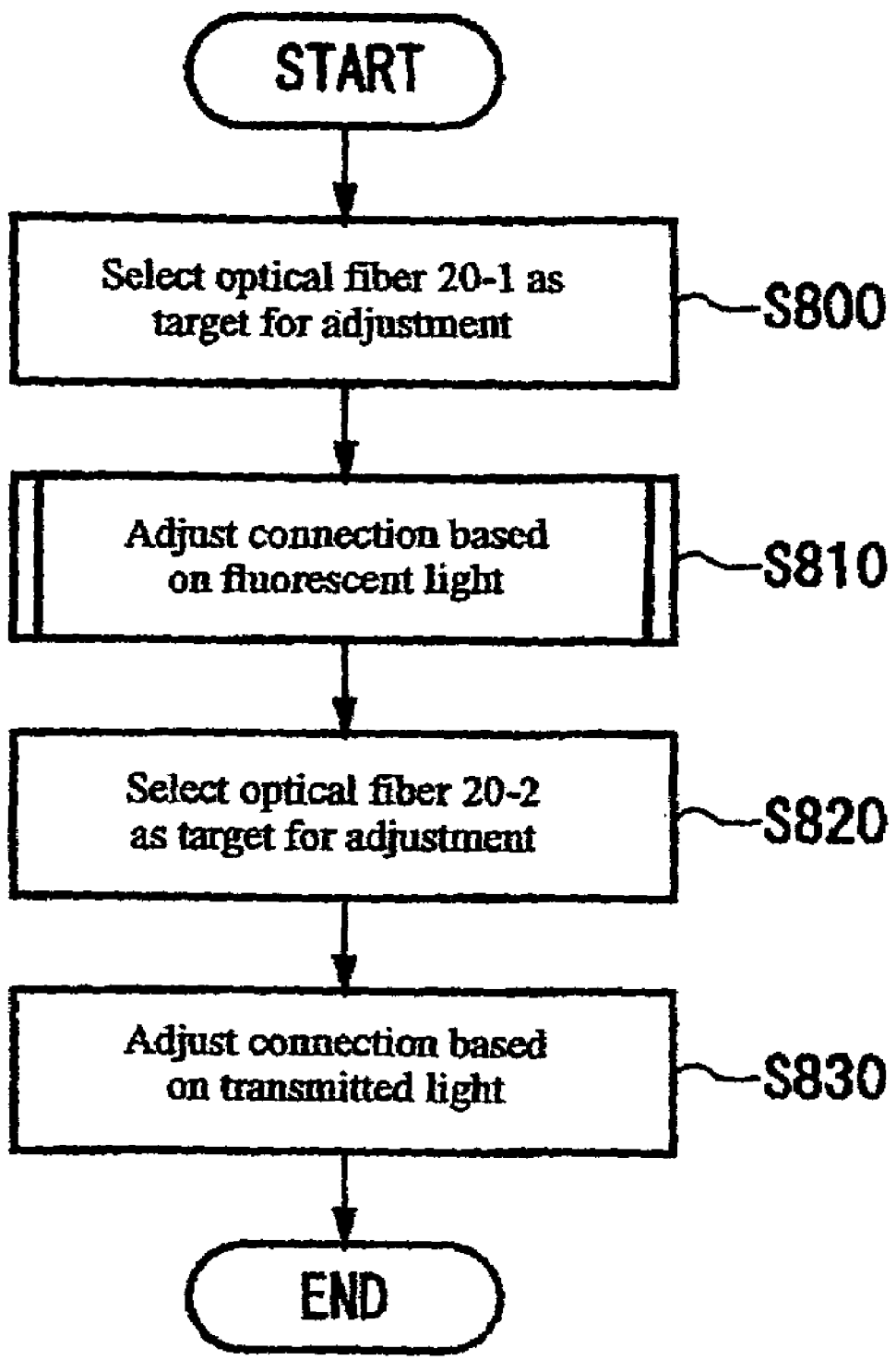
FIG. 8 shows an operation flow of optical connection adjustment by the aligner 10 according to a third application example.

FIG. 8 shows an operation flow of optical connection adjustment by the aligner 10 according to a third application example. With reference to this example, process of connecting the optical fibers 20-1 and 20-2 to the incidence side and the outgoing side of the waveguide substrate 30-1, respectively, will be described. First, the optical interconnection component position/posture controlling section 130 selects the optical fiber 20-1 as the target for adjustment (S800). For example, the optical interconnection component position/posture controlling section 130 sets a movement range and a unit distance in order that the optical fiber 20-1 can be moved with respect to the waveguide substrate 30-1 within a predetermined movement range on a predetermined-unit-distance basis.

Then, based on the intensity of the fluorescent light received at the light observing section 120, the connection adjusting section 150 adjusts the optical connection between the optical fiber 20-1 and the waveguide substrate 30-1 (S810). Specifically, the excitation light launching section 100 launches the excitation light into one end of the waveguide substrate 30-1 via the optical fiber 20-1. Then, each time the optical interconnection component position/posture controlling section 130 moves the optical fiber 20-1, the light observing section 120 receives the fluorescent light emitted from the side face of the waveguide in the waveguide substrate 30-1. Then, the connection adjusting section 150 determines the position of the optical fiber 20-1 at which the light observing section 120 receives the fluorescent light of the highest intensity as the installation position for the optical fiber 20-1.

Then, the optical interconnection component position/posture controlling section 130 selects the optical fiber 20-2 as the target for adjustment (S820). For example, the optical interconnection component position/posture controlling section 130 sets a movement range and a unit distance in order that the optical fiber 20-2 can be moved with respect to the waveguide substrate 30-1 within a predetermined movement range on a predetermined-unit-distance basis. Then, based on the intensity of the transmitted light for optical communications launched by the communication light launching section 110 and transmitted through the waveguide substrate 30-1 and the optical fiber 20-2, the connection adjusting section 150 adjusts the optical connection between the optical fiber 20-2 and the waveguide substrate 30-1 (S830).

Specifically, the communication light launching section 110 launches the light for optical communications from the optical fiber 20-1 into the optical fiber 20-2 via the waveguide substrate 30-1. Then, the light observing section 120 receives the transmitted light launched by the communication light launching section 110 and transmitted through the waveguide substrate 30-1 and the optical fiber 20-2. The connection adjusting section 150 determines the position of the optical fiber 20-2 at which the transmitted light has the highest intensity as the installation position for the optical fiber 20-2.

In this way, if the optical connection at one of the incidence side and the outgoing side is adjusted based on the intensity of the fluorescent light emitted from the side face of the waveguide substrate, the optical connection at the other of the incidence side and the outgoing side can be adjusted without problems according to a conventional method by the transmitted light. That is, the aligner 10 according to this embodiment can be combined with a conventional method to compensate for the disadvantage of the conventional method.

Alternatively, the light observing section 120 may receive the transmitted excitation light launched by the excitation light launching section 100 and transmitted through the waveguide substrate 30-1 and the optical fiber 20-2. In this case, the connection adjusting section 150 adjusts the optical connection between the optical fiber 20-2 and the waveguide substrate 30-1 based on the intensity of the transmitted excitation light. In this way, in the case where the waveguide is sufficiently short and the excitation light is attenuated only slightly, the communication light launching section 110 is not necessary, and thus, the arrangement of the aligner 10 can be simplified.

Figure 9:
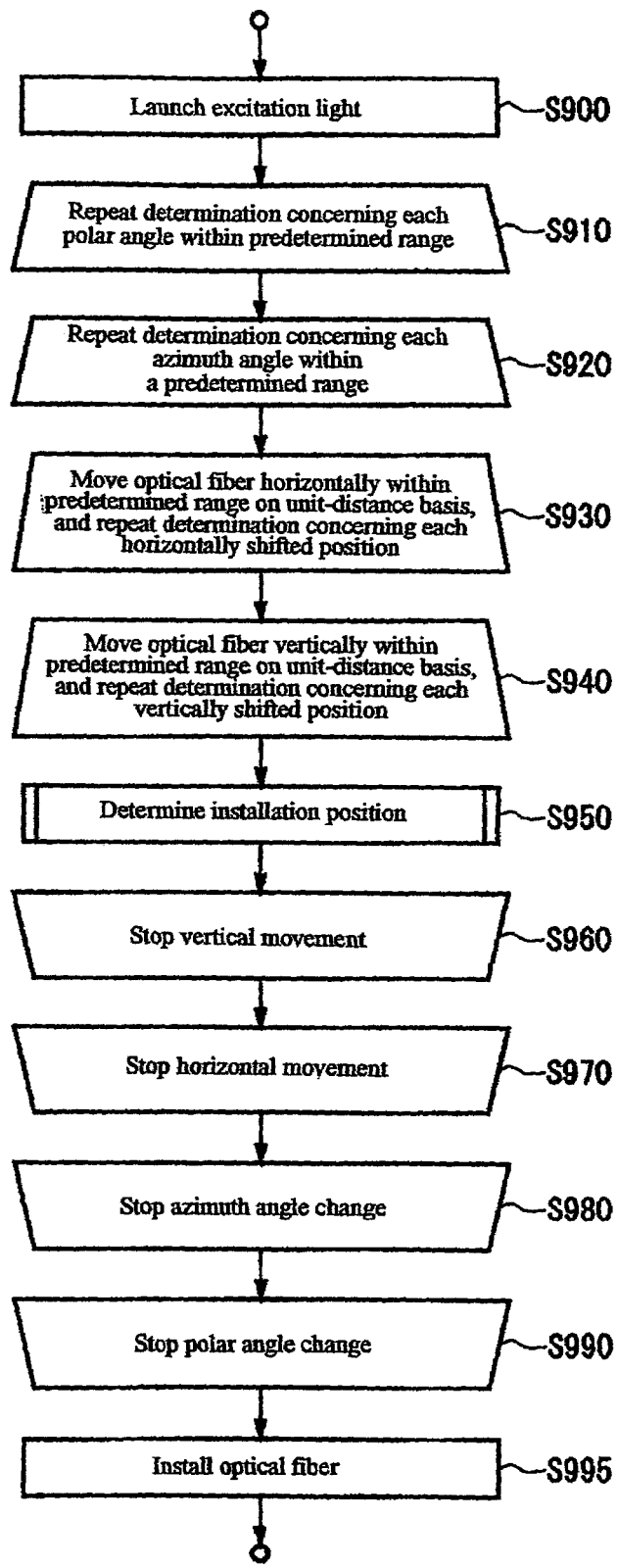
FIG. 9 shows an operation flow of a process of optical connection adjustment based on the intensity of fluorescent light.

FIG. 9 shows an operation flow of a process of adjusting an optical connection based on the intensity of fluorescent light. The excitation light launching section 100 launches the excitation light that causes the waveguide in the waveguide substrate 30-1 to emit fluorescent light into the waveguide substrate 30-1 via the optical fiber 20-1 (S900). Then, the optical interconnection component position/posture controlling section 130 adjusts a relative angle of the optical fiber 20-1 with respect to the end face of the waveguide substrate 30-1 and a relative installation position for the optical fiber 20-1 with respect to the installation position for the waveguide substrate 30-1 (S910 to S940).

Specifically, first, the optical interconnection component position/posture controlling section 130 changes the polar angle of the optical fiber 20-1 with respect to the end face of the waveguide substrate 30-1 within a predetermined range on a predetermined-angle basis and makes a determination described below concerning each of the changed polar angles (S910). In addition, the optical interconnection component position/posture controlling section 130 changes the azimuth angle of the optical fiber 20-1 with respect to the end face of the waveguide substrate 30-1 within a predetermined range on a predetermined-angle basis and makes a determination described below concerning each of the changed azimuth angles (S920).

In addition, the optical interconnection component position/posture controlling section 130 moves the optical fiber 20-1 horizontally with respect to the end face of the waveguide substrate 30-1 within a predetermined movement range on a predetermined-unit-distance basis and makes a determination described below concerning each of the horizontally shifted positions (S930). In addition, the optical interconnection component position/posture controlling section 130 moves the optical fiber 20-1 vertically with respect to the end face of the waveguide substrate 30-1 within a predetermined movement range on a predetermined-unit-distance basis and makes a determination described below concerning each of the vertically shifted positions (S940).

The connection adjusting section 150 determines whether or not the polar angles, the azimuth angles, the horizontally shifted positions and the vertically shifted positions of the optical fiber 20-1 resulting from change and determination by the optical interconnection component position/posture controlling section 130 are appropriate as the installation position for the optical fiber 20-1 (S950).

The determination described above is made each time the vertical position is changed, each time the horizontal position is changed, each time the azimuth angle is changed, and each time the polar angle is changed (S960, S970, S980, S990). Then, the connection adjusting section 150 installs the optical fiber 20-1 at the installation position for the optical fiber 20-1 determined in step S950 (S995).

Figure 10:
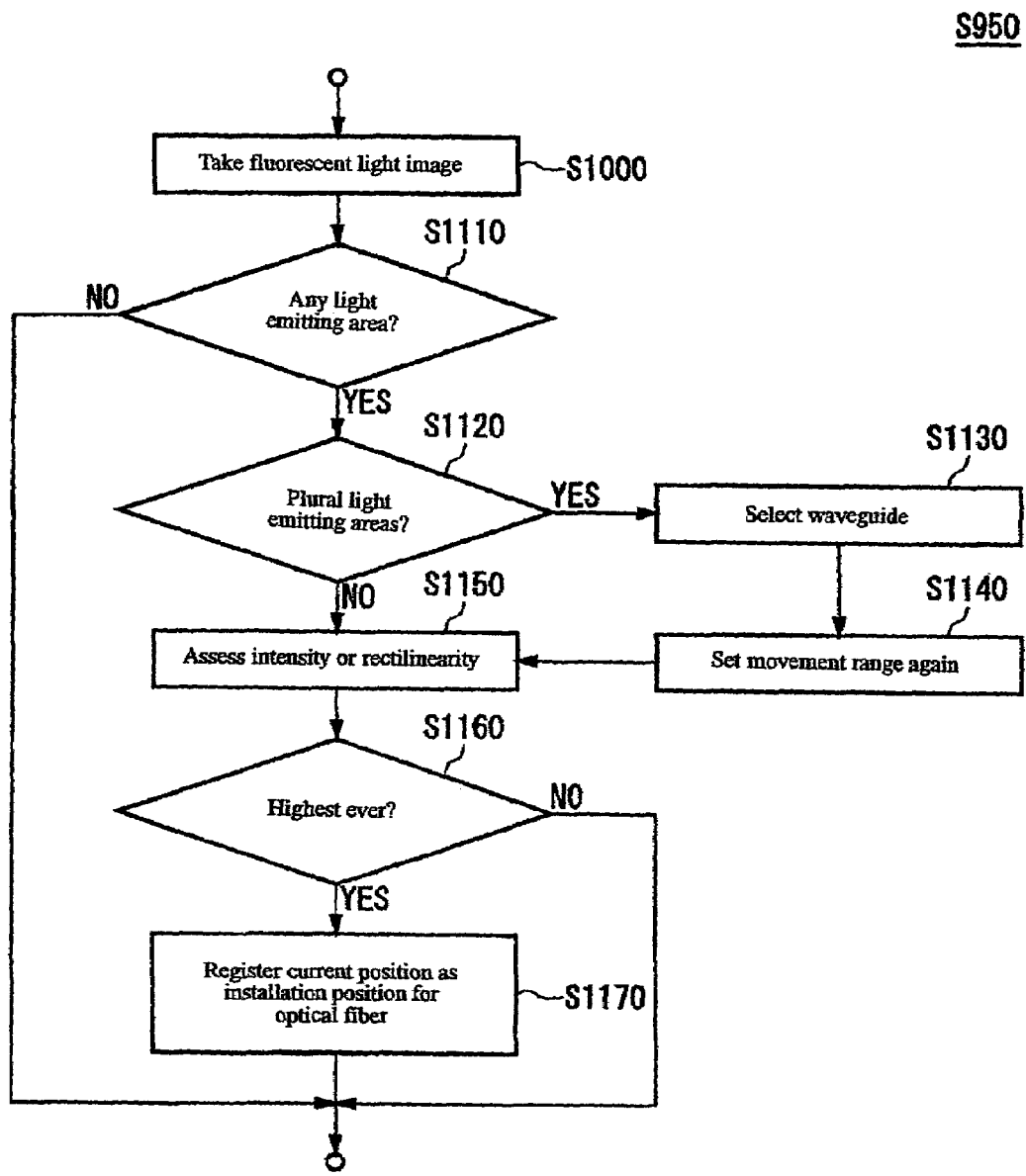
FIG. 10 shows details of step S950 shown in FIG. 9.

FIG. 10 shows details of the step S950 in FIG. 9. The light observing section 120 takes an image of the fluorescent light emitted from the side face of the waveguide substrate 30-1 (S1000). If the waveguide substrate 30-1 has a light emitting area (if YES in S1110), the light observing section 120 determines whether plural waveguides emit fluorescent light from the side faces or not (S1120).

If plural waveguides emit fluorescent light from the side faces (if YES in S1120), the light observing section 120 selects one of the plural waveguides that is specified by the user as the target for adjustment (S1130) and receives the fluorescent light emitted from the side face of the selected waveguide. In this case, the optical interconnection component position/posture controlling section 130 may set again the range of movement of the optical fiber 20-1 with respect to the waveguide substrate 30-1, centered on the specified waveguide (S1140).

Then, based on the fluorescent light image taken by the light observing section 120, the rectilinearly assessing section 140 assesses the rectilinearly of the light propagating through the waveguide (S1150). Alternatively, the connection adjusting section 150 may assess the intensity of the fluorescent light based on the fluorescent light image taken by the light observing section 120. Then, if the highest rectilinearly or intensity is achieved (if YES in S1160), the connection adjusting section 150 registers the current position and angle of the optical fiber 20-1 as the installation position for the optical fiber 20-1 (S1170).

As described above and shown in FIGS. 9 and 10, the optical interconnection component position/posture controlling section 130 successively changes the position and angle of the optical fiber 20-1, and the light observing section 120 receives the fluorescent light each time the position and angle of the optical fiber 20-1 are changed. Then, the connection adjusting section 150 determines the position or angle of the optical fiber 20-1 at which the highest intensity of the fluorescent light or the highest rectilinearly of the excitation light is achieved as the position or angle of the optical fiber 20-1. Thus, the optical connection can be adjusted based on the intensity of the fluorescent light emitted from the side face of the waveguide, without measuring the intensity of the light transmitted through and emitted from the waveguide.

Figure 11:
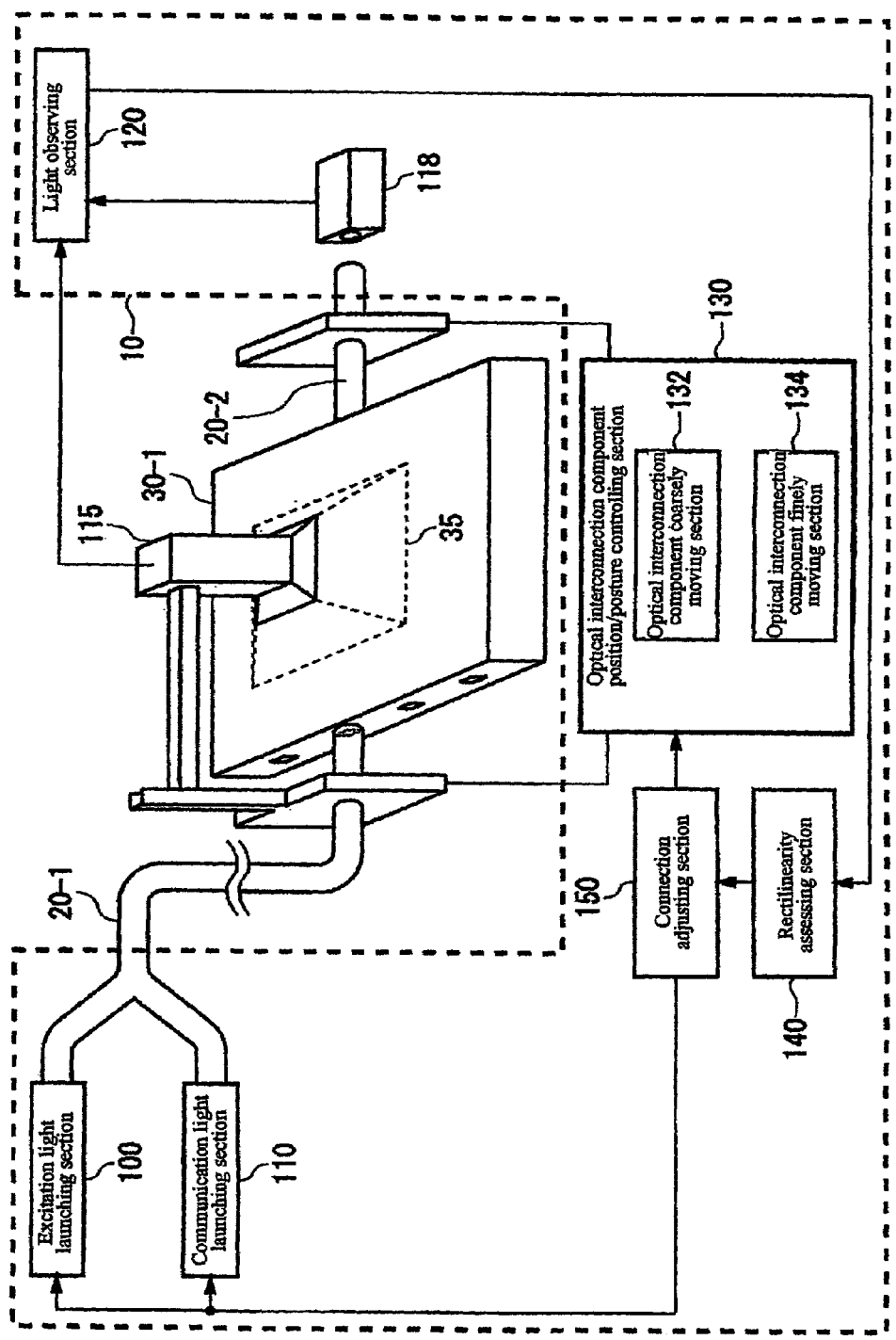
FIG. 11 shows an arrangement of the aligner 10 according to a first modified embodiment.

FIG. 11 shows an arrangement of the aligner 10 according to a first modified embodiment. According to this modified embodiment, unlike the arrangement shown in FIG. 1, the optical fiber 20-1 is connected to the camera 115. Here, the camera 115 is a device that measures the intensity of the fluorescent light emitted from a point in a plane, such as a photodiode. Preferably, the camera 115 is placed on a normal line drawn to the surface of the waveguide substrate 30-1 and intersecting with the line of the light launched into the waveguide in the waveguide substrate 30-1. Furthermore, preferably, even if the optical fiber 20-1 moves vertically with respect to the plane of the waveguide substrate 30-1, the camera 115 does not move and keeps the distance from the waveguide substrate 30-1 at an appropriate distance for measuring the intensity of the fluorescent light.

For example, as the optical interconnection component position/posture controlling section 130 moves the optical fiber 20-1 horizontally with respect to the plane of the waveguide substrate 30-1, it can move the camera 115 with respect to the waveguide substrate 30-1. As a result, as the optical interconnection component position/posture controlling section 130 moves the optical fiber 20-1, the light observing section 120 can change the position to be observed. The remainder of the arrangement of the aligner 10 according to this modified embodiment is substantially the same as that shown in FIG. 1 and thus will not be described.

As described above, according to this modified embodiment, even if the optical fiber 20-1 moves, the light observing section 120 can always receive the fluorescent light emitted from a point on an extension line of the light launched from the optical fiber 20-1 into the waveguide in the waveguide substrate 30-1. Thus, unlike the case shown in FIG. 1, the entire fluorescent light image does not have to be taken, and the installation position for the camera 115 does not have to be determined before adjustment. Therefore, the arrangement and adjustment procedure of the camera 115 can be simplified.

Figure 12:
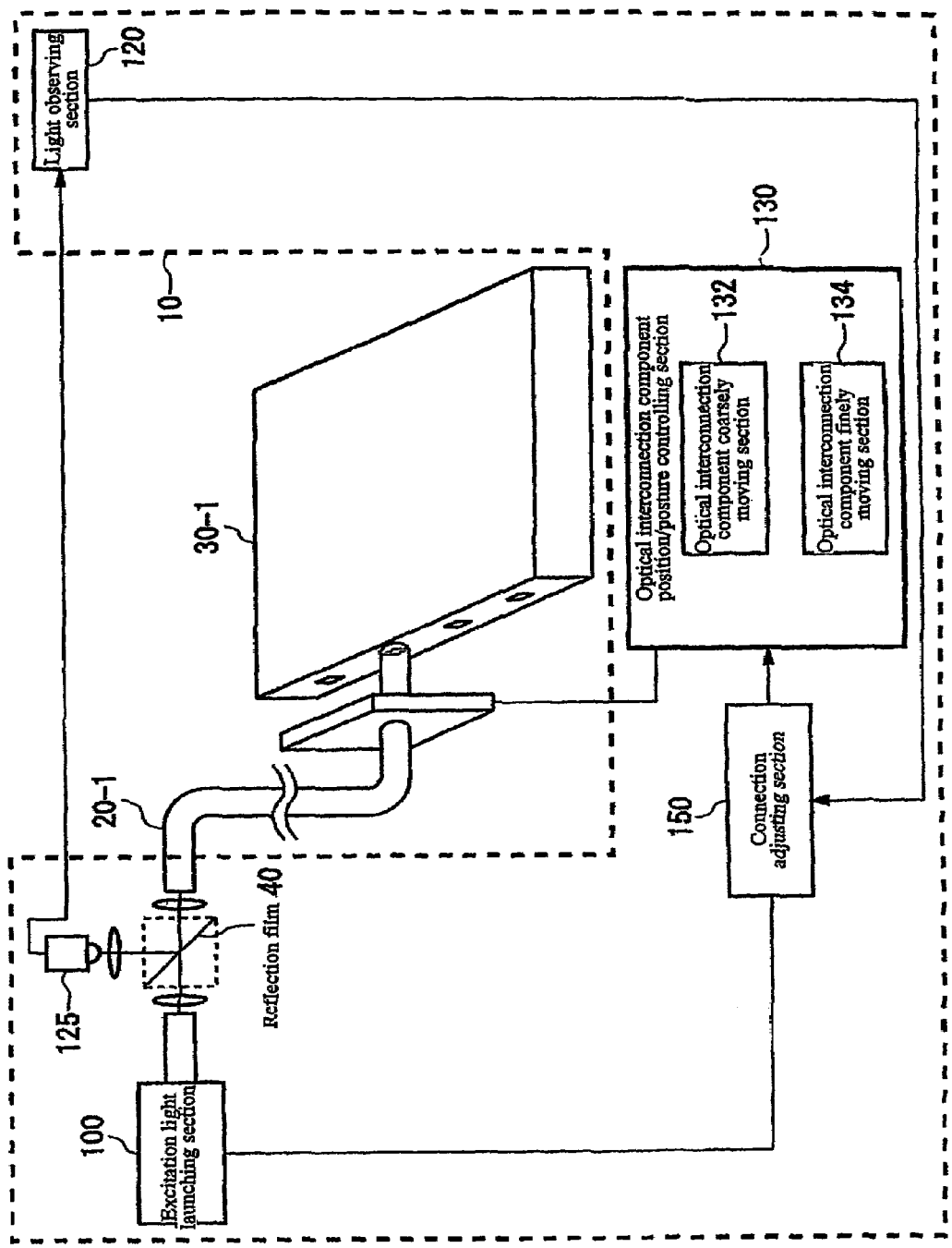
FIG. 12 shows an arrangement of the aligner 10 according to a second modified embodiment.

FIG. 12 shows an arrangement of the aligner 10 according to a second modified embodiment. The aligner 10 comprises a reflection film 40, the excitation light launching section 100, the light observing section 120, a light receiving element 125, the optical interconnection component position/posture controlling section 130 and the connection adjusting section 150. According to this modified embodiment, the optical fiber 20-1 is cut into two sections, and a lens and a prism are disposed between the two optical fiber sections. In addition, the reflection film 40 is formed on the reflection surface of the prism. For example, the reflection film 40 may be a multi-layer reflection film using the Bragg reflection. In this case, the reflection film has a reflection wavelength equal to the wavelength of the fluorescent light emitted by the waveguide material.

The excitation light launching section 100 launches the excitation light that causes the waveguide in the waveguide substrate 30-1 to emit fluorescent light into the waveguide substrate 30-1 via the optical fiber 20-1. In this process, the excitation light emitted from the excitation light launching section 100 passes through the reflection film 40 and is incident on the optical fiber 20-1. The excitation light causes the core material of the waveguide to emit fluorescent light, and the fluorescent light is emitted from the end faces of the waveguide after repeated total reflections at the interface between the core and the clad. Therefore, the fluorescent light is emitted also from the end face on which the excitation light has been incident.

The fluorescent light emitted from the optical fiber 20-1 is reflected and redirected by the reflection film 40 and then reaches a light receiving element 125. That is, the light observing section 120 receives, at the light receiving element 125, the fluorescent light that is generated in the waveguide substrate 30-1 and emitted from the waveguide substrate 30-1 into the optical fiber 20-1. Here, a higher intensity of the fluorescent light received at the light receiving element 125 means that more core material is excited. And, more core material excited means that the excitation light propagating through the waveguide has a higher rectilinearly or intensity.

The optical interconnection component position/posture controlling section 130 moves the optical fiber 20-1 with respect to the waveguide substrate 30-1, and the light observing section 120 receives the fluorescent light each time the optical interconnection component position/posture controlling section 130 moves the optical fiber 20-1. Then, based on the intensity of the fluorescent light, the connection adjusting section 150 determines the position of the optical fiber 20-1 at which the fluorescent light has the highest intensity as the installation position for the optical fiber 20-1. The remainder of the arrangement of the aligner 10 according to this modified embodiment is substantially the same as that shown in FIG. 1 and thus will not be described.

As described above, according to this modified embodiment, even if the side face of the waveguide cannot be observed, the optical connection can be adequately adjusted based on the intensity of the fluorescent light emitted from the end face of the waveguide.

Figure 13:
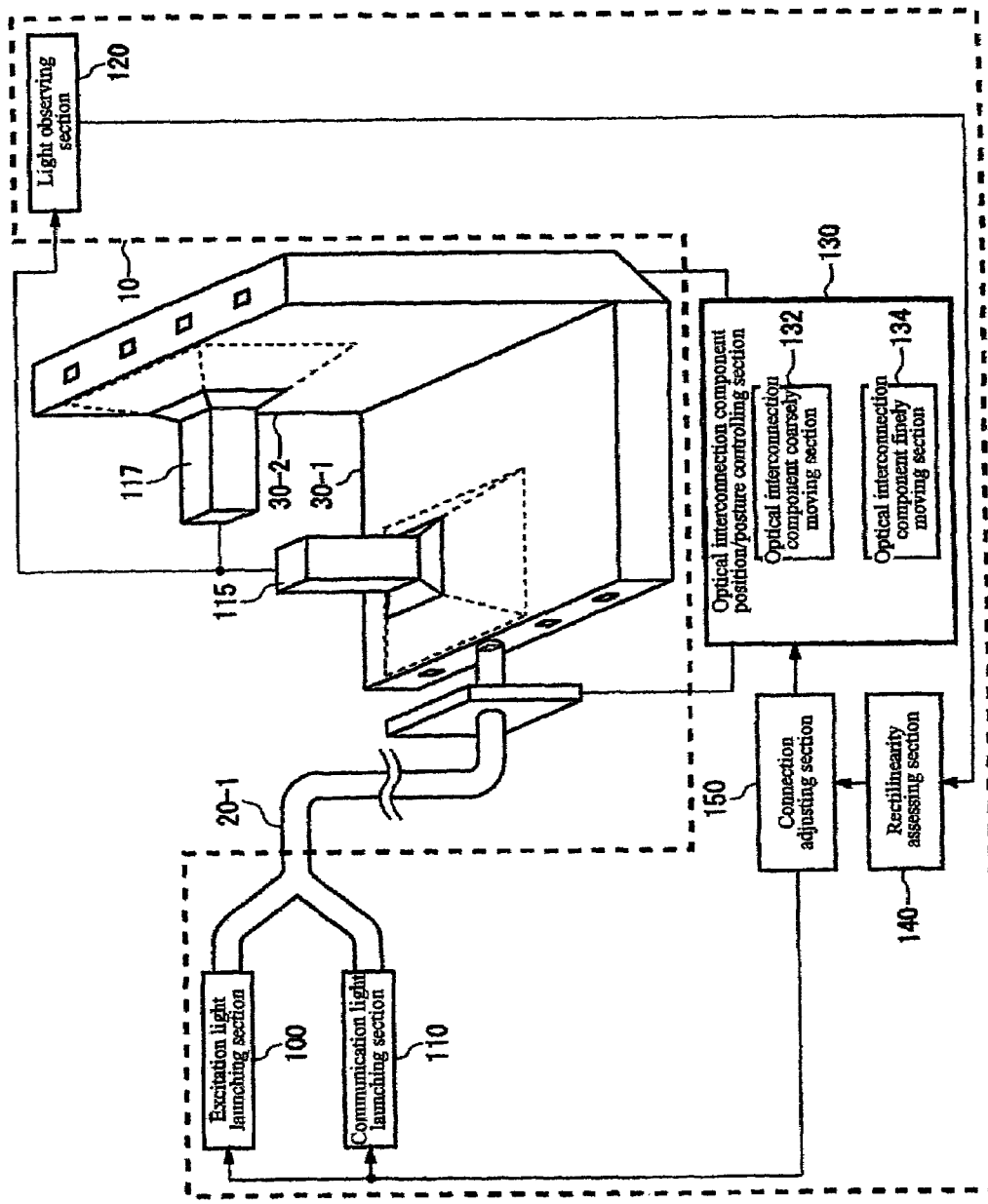
FIG. 13 shows an arrangement of the aligner 10 according to a third modified embodiment.

FIG. 13 shows an arrangement of the aligner 10 according to a third modified embodiment. The aligner 10 comprises the excitation light launching section 100, the communication light launching section 110, the light observing section 120, the optical interconnection component position/posture controlling section 130, the rectilinearly assessing section 140 and the connection adjusting section 150. Unlike the aligner 10 shown in FIG. 1, the aligner 10 according to this modified embodiment is intended to align the waveguide substrate 30-1, which is a first waveguide, and a waveguide substrate 30-2 longer than the waveguide substrate 30-1, which is a second waveguide, that are connected in series with the optical fiber 20-1.

The excitation light launching section 100 launches the excitation light into one end of the waveguide substrate 30-1 via the optical fiber 20-1. The communication light launching section 110 launches the light for optical communications into the waveguide in the waveguide substrate 30-1 via the optical fiber 20-1. For example, the communication light launching section 110 is used independently of the excitation light launching section 100 to improve the alignment precision of the optical connection. The light observing section 120 receives the fluorescent light caused in the waveguide substrate 30-1 by the excitation light launched into the waveguide substrate 30-1 by means of the camera 115.

The optical interconnection component position/posture controlling section 130 moves the optical fiber 20-1 with respect to the waveguide substrate 30-1. For example, the optical interconnection component position/posture controlling section 130 comprises the optical interconnection component coarsely moving section 132 that moves the optical fiber 20-1 with respect to the waveguide substrate 30-1 on a predetermined first-unit-distance basis and the optical interconnection component finely moving section 134 that moves the optical fiber 20-1 with respect to the waveguide substrate 30-1 on a predetermined second-unit-distance basis, the second unit distance being shorter than the first unit distance.

The rectilinearly assessing section 140 assesses the rectilinearly of the light propagating through the waveguide in the waveguide substrate 30-1 based on the fluorescent light image taken by the light observing section 120. Then, based on the rectilinearly of the light assessed by the rectilinearly assessing section 140, the connection adjusting section 150 adjusts the optical connection between the optical fiber 20-1 and the waveguide substrate 30-1. For example, the connection adjusting section 150 can assess the rectilinearly of the image of the light each time the optical interconnection component position/posture controlling section 130 moves the optical fiber 20-1, and then determine the position of the optical fiber 20-1 at which the highest rectilinearly is achieved as the installation position for the optical fiber 20-1.

Furthermore, the light observing section 120 receives the fluorescent light caused in the waveguide substrate 30-2 by the excitation light emitted from the other end of the waveguide substrate 30-1 and launched into one end of the waveguide substrate 30-2 by means of a camera 117. Again, the rectilinearly assessing section 140 assesses the rectilinearly of the light propagating through the waveguide in the waveguide substrate 30-2 based on the fluorescent light image taken by the light observing section 120. Based on the rectilinearly of the light assessed by the rectilinearly assessing section 140, the connection adjusting section 150 adjusts the optical connection between the waveguide substrate 30-1 and the waveguide substrate 30-2.

Figure 14:
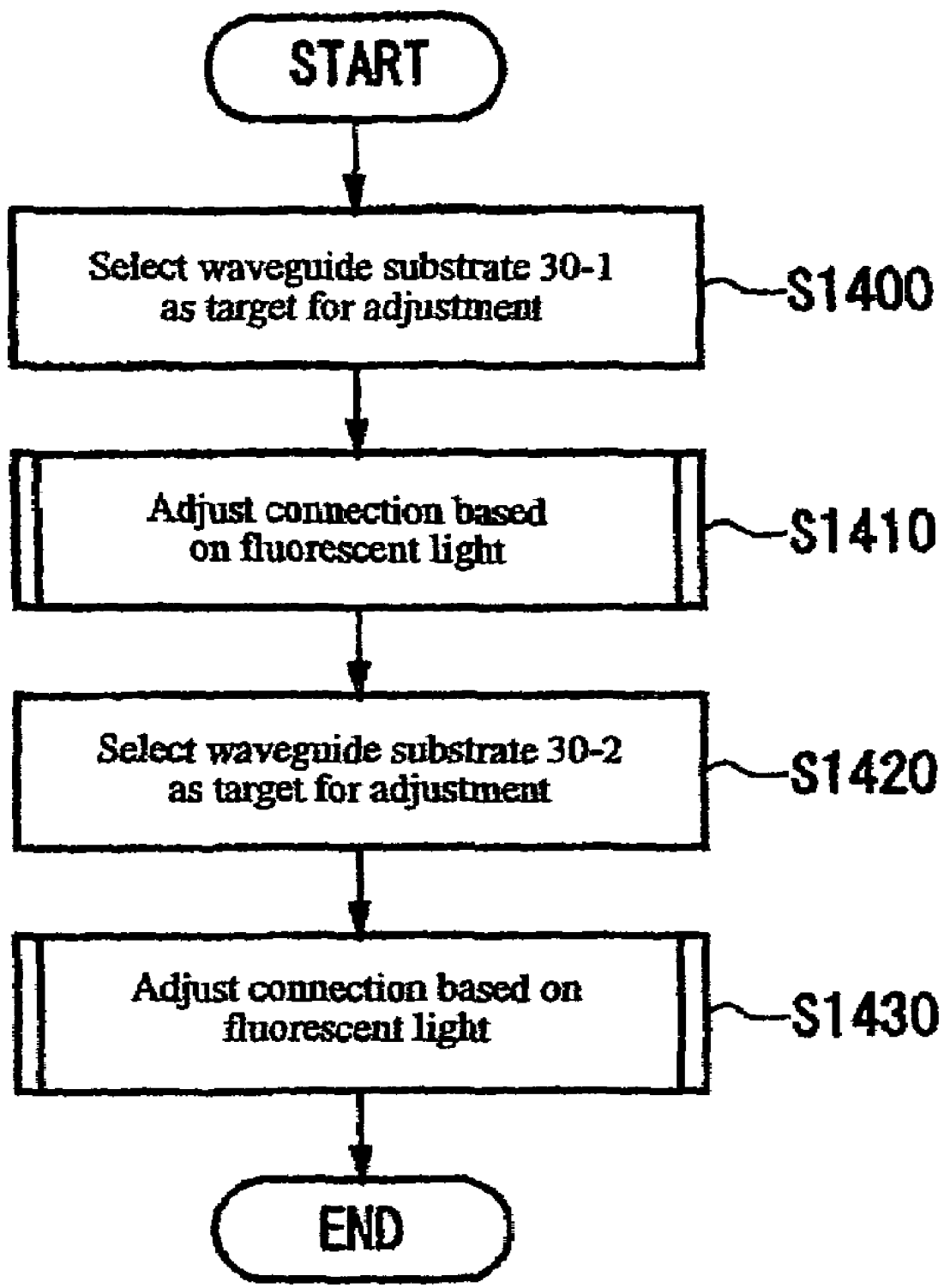
FIG. 14 shows an operation flow of a process of optical connection adjustment by the aligner 10 according to the third modified embodiment.

FIG. 14 shows an operation flow of a process of optical connection adjustment by the aligner 10 according to the third modified embodiment. The optical interconnection component position/posture controlling section 130 selects the waveguide substrate 30-1 as the target for adjustment (S1400). For example, the optical interconnection component position/posture controlling section 130 may set a movement range of the movement of the optical fiber 20-1 with respect to the waveguide substrate 30-1 or a unit distance of the movement of the optical fiber 20-1 with respect to the waveguide substrate 30-1.

Based on the intensity of the fluorescent light received by the light observing section 120, the connection adjusting section 150 adjusts the optical connection between the optical fiber 20-1 and the waveguide substrate 30-1 (S1410). The details of the step S1410 are substantially the same as that described with reference to FIG. 9 and thus will not be described here. Then, the optical interconnection component position/posture controlling section 130 selects the waveguide substrate 30-2 as the target for adjustment (S1420). For example, the optical interconnection component position/posture controlling section 130 may set a movement range of the movement of the waveguide substrate 30-1 with respect to the waveguide substrate 30-2 or a unit distance of the movement of the waveguide substrate 30-1 with respect to the waveguide substrate 30-2. Based on the intensity of the fluorescent light received by the light observing section 120, the connection adjusting section 150 adjusts the optical connection between the waveguide substrate 30-2 and the waveguide substrate 30-1 (S1430). The details of the step S1430 are substantially the same as that described with reference to FIG. 9 and thus will not be described here.

As described above, according to this modified embodiment, when a plurality of waveguides are connected in series to each other, the connections there between can be aligned at a time using the excitation light launched into one waveguide. Thus, the incidence point does not have to be changed, and therefore, the number of steps involved with the optical connection adjustment can be reduced. In addition, in the case where two waveguides are connected in series to each other, the fluorescent light can be appropriately generated in the both waveguides by launching the excitation light into the waveguide of shorter length.

As described above with reference to the embodiment and the modified embodiments, the aligner 10 can appropriately determine whether the incident light is transmitted through the core of the waveguide or not based on the fluorescent light image observed from the side face of the waveguide. Thus, the position of the core does not have to be found before adjustment, so that the number of steps involved with the adjustment can be reduced. In addition, since the optical connections can be adjusted separately on the incidence side and the outgoing side, it can be prevented to set the optical fiber at a locally optimum position. Furthermore, when a new optical interconnection component is added to existing optical wiring, a light transmission test does not have to be conducted on the entire optical wiring, and only needed is the adjustment of the newly added optical connections, so that the work efficiency is improved. In addition, since the waveguide is sufficiently short, the optical connection can be adequately adjusted, even if it is impossible to discriminate between the clad incidence and the core incidence based only on the intensity of the transmitted light.

In the drawings and specifications there has been set forth a preferred embodiment of the invention and, although specific terms are used, the description thus given uses terminology in a generic and descriptive sense only and not for purposes of limitation.

What is claimed is:

1. Apparatus comprising:
   an optical waveguide;
   an optical interconnection device having a connection adjusting component;
   an excitation light emitting device coupled to said waveguide and directing to said waveguide a frequency of light which excites said waveguide to fluoresce; and
   a observation device coupled to said waveguide and said connection adjusting component;
   said observation device responding to fluorescence of said waveguide and directing said connection adjusting component to adjust an optical connection between said waveguide and said interconnection device.

2. Apparatus according to claim 1 wherein
   said waveguide has a core which propagates light and a clad surrounding said core;
   said excitation light emitting device directs light into said core via said interconnection device; and
   said observation device receives fluorescence transmitted through said clad.

3. Apparatus according to claim 2 wherein
   said waveguide comprises a plurality of cores and said clad is shared with said plurality of cores;
   said observation device responds to a selected one of said plurality of cores; and
   said observation device and said connection adjusting component cooperate to adjust the optical connection as a function of the intensity of the fluorescence.

4. Apparatus according to claim 1 wherein the frequency of light emitted by said excitation light emitting device differs from the frequency of light used for optical communication through said waveguide.

5. Apparatus according to claim 1 wherein
   said waveguide is made of an organic material; and
   said waveguide fluoresces with visible light.

6. Apparatus according to claim 5 wherein said waveguide is fabricated using a core material selected from the group consisting of polysilane, acryl and epoxy.

7. Apparatus according to claim 1 wherein said observation device captures an image of the waveguide fluorescence and comprises a rectilinearly assessing device coupled to said observation device which assesses the rectilinearly of the waveguide fluorescence and further wherein said connection adjusting component adjusts the optical connection between said waveguide and said interconnection device as a function of the assessed rectilinearly of the waveguide fluorescence.

8. Apparatus according to claim 7 wherein said rectilinearly assessing device assess the rectilinearly of the fluorescence as higher when the variation in the inclination of the image with respect to the propagation direction of light used for optical communication through said waveguide is smaller.

9. Apparatus according to claim 7 wherein said rectilinearly assessing device assess the rectilinearly of the fluorescence as higher when the variation in the brightness of the image with respect to the propagation direction of light used for optical communication through said waveguide is smaller.

10. Apparatus according to claim 7 wherein said rectilinearly assessing device calculates the distance, along a line perpendicular to the propagation direction of the light used for optical communication through said waveguide, from a point at which the fluorescence of the image taken by said observation device has the highest intensity to a point at which the intensity of the fluorescence decreases to a predetermined percentage of the highest intensity, and assesses the rectilinearly of the light as higher when the calculated distance is smaller.

11. Apparatus according to claim 7 wherein said rectilinearly assessing device assesses the rectilinearly of the light as higher when the symmetry of said fluorescence image taken by said observation device along the line perpendicular to the propagation direction of the light used for optical communication through said waveguide with respect to the point at which the fluorescence has the highest intensity is higher.

12. Apparatus according to claim 1 wherein
said connection adjusting component has
   a coarse movement component that moves said optical interconnection component with respect to said waveguide on a predetermined first-unit-distance basis; and
   a fine movement component that moves said optical interconnection component with respect to said waveguide on a predetermined second-unit-distance basis, within a movement range that is narrower than a movement range for said coarse movement component and contains the position at which the observation device receives the fluorescence of the highest intensity, the predetermined second-unit-distance being shorter than the predetermined first-unit-distance;
said observation device receiving fluorescence from a side face of said waveguide each time that said coarse movement component adjusts the optical connection between said waveguide and said interconnection device; and
said observation device receiving fluorescence from a side face of said waveguide each time that said fine movement component adjusts the optical connection between said waveguide and said interconnection device; and
said connection adjusting component determining the relative positioning of said waveguide and said interconnection device at which received fluorescence is highest as an installation position for optical connection.

13. Apparatus according to claim 1 further comprising:
a communication light emitting device coupled to said waveguide and directing to said waveguide light for optical communication transmission through said waveguide; and wherein
said connection adjusting component adjusts the optical connection between said optical interconnection device and said waveguide with a first predetermined precision based on the intensity of the fluorescence received by said observation device and adjusts the optical connection between said optical interconnection device and said waveguide with a second precision higher than said first predetermined precision based on the intensity of the transmitted light launched into said waveguide by said communication light emitting device and transmitted through said waveguide.

14. Apparatus comprising:
first and second optical interconnection devices, each having a connection adjusting component;
an optical waveguide extending between and operatively coupled to each of said first and second optical interconnection devices;
an excitation light emitting device coupled to said waveguide and directing into one end of said waveguide, via said first optical interconnection device, a frequency of light which excites said waveguide to fluoresce;
a communication light emitting device coupled to said waveguide and directing into the one end of said waveguide, via said first optical interconnection device, light for optical communication transmission through said waveguide; and
a observation device coupled to said waveguide and said connection adjusting component of said first optical interconnection device;
said observation device responding to fluorescence of said waveguide and to transmitted light for optical communication and directing said connection adjusting component to adjust an optical connection between said waveguide and said first interconnection device.

15. Apparatus comprising:
first and second optical waveguides coupled together in series, one of said waveguides being of greater length than the other;
an optical interconnection device having a connection adjusting component;
an excitation light emitting device coupled to said waveguide and directing to said first and second waveguides a frequency of light which excites said waveguide to fluoresce; and
a observation device coupled to said first and second waveguides and said connection adjusting component;
said observation device responding to fluorescence of said first waveguide and directing said connection adjusting component to adjust an optical connection between said first waveguide and said interconnection device; and
said observation device responding to fluorescence of said second waveguide and directing said connection adjusting component to adjust an optical connection between said first waveguide and said second waveguide.

16. Method comprising:
emitting into an end face of a waveguide light at a frequency which causes the waveguide to fluoresce;
observing the fluorescence of the waveguide from a side face different from the end face into which fluorescence causing light is emitted; and
adjusting the optical alignment of the waveguide with an interconnection device based on the intensity of the fluorescence of the waveguide.

17. Method according to claim 16 wherein the emitting of fluorescence causing light comprises transmitting light from an interconnection device.

18. Method according to claim 16 further comprising:
emitting into an end face of a waveguide light at a frequency used for transmission of communication;
observing the intensity of transmitted light at a frequency used for transmission of communication; and
secondarily adjusting the optical alignment of the waveguide with the interconnection device based on the intensity of the transmitted light at a frequency used for transmission of communication.

* * * * *